(12) United States Patent
Komiya et al.

(10) Patent No.: US 7,781,535 B2
(45) Date of Patent: Aug. 24, 2010

(54) PROTON CONDUCTOR

(75) Inventors: Teruaki Komiya, Fujimi (JP); Tadahiro Shiba, Shiki (JP)

(73) Assignee: Honda Motor Co., Ltd., Tokyo (JP)

( * ) Notice: Subject to any disclaimer, the term of this patent is extended or adjusted under 35 U.S.C. 154(b) by 1489 days.

(21) Appl. No.: 11/072,940

(22) Filed: Mar. 3, 2005

(65) Prior Publication Data

US 2005/0197467 A1 Sep. 8, 2005

(30) Foreign Application Priority Data

Mar. 3, 2004 (JP) ............................. 2004-059640

(51) Int. Cl.
C08F 8/22 (2006.01)
(52) U.S. Cl. ..................... 525/353; 525/394; 525/425
(58) Field of Classification Search .................. 525/353, 525/394, 425
See application file for complete search history.

(56) References Cited

U.S. PATENT DOCUMENTS

| 6,025,457 | A | 2/2000 | Ohno et al. |
| 7,388,050 | B2 * | 6/2008 | Iwadate et al. ............... 525/180 |
| 2003/0165737 | A1 | 9/2003 | Nakagawa et al. |
| 2004/0013925 | A1 | 1/2004 | Komiya |
| 2004/0013926 | A1 | 1/2004 | Akita et al. |
| 2005/0221193 | A1 | 10/2005 | Kinouchi et al. |

FOREIGN PATENT DOCUMENTS

| CA | 2407609 A1 | 11/2001 |
| EP | 1449886 A1 | 8/2004 |
| JP | 45-41298 | 12/1970 |
| JP | 5-174856 | 7/1993 |
| JP | 08-162132 | 6/1996 |
| JP | 10-92467 | 4/1998 |
| JP | 2002-83612 | 3/2002 |
| JP | 2003-20415 | 1/2003 |
| JP | 2003-22823 | 1/2003 |
| JP | 2003-022823 * | 1/2003 |
| JP | 2003-22824 | 1/2003 |
| JP | 2004-047232 * | 2/2004 |
| JP | 2004-47232 | 2/2004 |
| JP | 2004-55257 | 2/2004 |
| WO | WO-01/66748 A1 | 11/2001 |
| WO | WO-01/83092 A1 | 11/2001 |
| WO | WO-03/045080 A1 | 6/2003 |
| WO | WO-03/001771 A1 | 12/2003 |
| WO | WO-04/001771 A1 | 12/2003 |

OTHER PUBLICATIONS

European Office Action for Application No. 05261281.1, dated Nov. 3, 2006.
Japanese Office Action for Application No. 2004-059640, dated Jan. 6, 2009.

* cited by examiner

Primary Examiner—Robert D. Harlan
(74) Attorney, Agent, or Firm—Lahive & Cockfield, LLP; Anthony A. Laurentano, Esq.; Brian C. Trinque

(57) ABSTRACT

An acidic group-containing polymer which has an acidic group such as sulfonic acid group, phosphoric acid group, and phosphonic acid group, and a proton acceptor which has a boiling point at 1 atmosphere higher than 100° C. and which functions as a medium for conducting proton dissociated from the acidic group are retained in pores of a porous member. Preferred examples of the proton acceptor include a salt structure composed of an anion and a cation derived from a basic organic compound, a basic organic compound, and a dissociation-facilitating polymer which facilitates dissociation of proton. Any one of the acidic group-containing polymer and the proton acceptor may be retained first, or both may be retained simultaneously.

21 Claims, 2 Drawing Sheets

FIG. 2

| | No. | PROTON CONDUCTIVITY [S/cm] | | RETENTION RATIO AFTER IMMERSION IN WATER [%] | EVALUATION OF CONDUCTIVITY | EVALUATION OF WATER RESISTANCE | OVERALL EVALUATION |
|---|---|---|---|---|---|---|---|
| | | −10°C | 160°C | | | | |
| EXAMPLE | 1 | $3.6 \times 10^{-7}$ | $1.5 \times 10^{-4}$ | 64 | ○ | ○ | ○ |
| | 2 | $2.0 \times 10^{-6}$ | $1.8 \times 10^{-3}$ | 58 | ○ | ○ | ○ |
| | 3 | $1.1 \times 10^{-7}$ | $2.0 \times 10^{-4}$ | 71 | ○ | ○ | ○ |
| | 4 | $8.7 \times 10^{-8}$ | $5.0 \times 10^{-5}$ | 60 | ○ | ○ | ○ |
| | 5 | $8.5 \times 10^{-8}$ | $8.2 \times 10^{-5}$ | 75 | ○ | ○ | ○ |
| | 6 | $5.2 \times 10^{-8}$ | $9.1 \times 10^{-6}$ | 99 | ○ | ○ | ○ |
| | 7 | $2.1 \times 10^{-7}$ | $1.0 \times 10^{-4}$ | 100 | ○ | ○ | ○ |
| | 8 | $4.4 \times 10^{-8}$ | $2.8 \times 10^{-5}$ | 100 | ○ | ○ | ○ |
| | 9 | $6.0 \times 10^{-7}$ | $3.3 \times 10^{-4}$ | 72 | ○ | ○ | ○ |
| | 10 | $3.3 \times 10^{-8}$ | $6.0 \times 10^{-5}$ | 85 | ○ | ○ | ○ |
| COMPARATIVE EXAMPLE | 1 | CANNOT BE MEASURED | $8.2 \times 10^{-8}$ | 60 | × | ○ | × |
| | 2 | CANNOT BE MEASURED | $5.0 \times 10^{-7}$ | 85 | × | ○ | × |
| | 3 | $1.1 \times 10^{-7}$ | $2.0 \times 10^{-4}$ | 15 | ○ | × | × |

PROTON CONDUCTOR

BACKGROUND OF THE INVENTION

1. Field of the Invention

The present invention relates to a proton conductor which is preferably usable, for example, as an electrolyte of a fuel cell.

2. Description of the Related Art

A fuel cell is constructed as follows. At first, an electrolyte is interposed between an anode and a cathode to provide an electrolyte-electrode joined assembly. Subsequently, the electrolyte-electrode joined assembly is interposed between a pair of separators to provide a unit cell. After that, a plurality of the unit cells are stacked to construct the fuel cell. For example, a material, which is obtained by moistening a perfluorosulfonic acid polymer membrane with liquid water, is used for the electrolyte. The electrolyte functions as a proton conductor to conduct, to the cathode, the proton which is generated by ionizing hydrogen on the anode.

The stacked unit cells are mutually tightened, for example, by means of tie rods. Therefore, the electrolyte needs to have mechanical strength such that the electrolyte is not damaged by the tightening force. Japanese Laid-Open Patent Publication No. 8-162132 suggests an electrolyte-electrode joined assembly which has a polymer solid electrolyte with an improved mechanical strength. In the case of the polymer solid electrolyte, a perfluorosulfonic acid polymer is retained in pores of drawn porous polytetrafluoroethylene (PTFE).

The proton conduction of the perfluorosulfonic acid polymer is extremely deteriorated when the polymer is dried. Therefore, a humidifier is equipped for the fuel cell. During the operation, the reaction gas, in which the humidity is raised by the steam supplied from the humidifier, is supplied. Accordingly, the electrolyte is maintained under a wet condition. In order to prevent the electrolyte from drying, the operation temperature is maintained to be 80° to 90° C. Owing to the above, the proton conduction of the electrolyte is maintained. In order to retain the operation temperature at 80° to 90° C., a cooling medium generally flows into the fuel cell.

The fuel cell is further equipped with a heater so that the steam for raising the humidity is not frozen when the outside air temperature is less than 0° C., for the following reason. That is, if the steam is frozen, the proton conductivity of the electrolyte is lowered. The fuel cell is heated by the heater, and the operation is started after the temperature of the fuel cell is higher than the freezing temperature of the steam.

According to the explanation as described above, it can be understood that the humidifier, the cooling system for allowing the cooling medium to flow, and the heater are required for the fuel cell in which the electrolyte is composed of the perfluorosulfonic acid polymer or the fuel cell in which the perfluorosulfonic acid polymer is retained in the pores of the electrolyte as a porous member. However, in the case of the fuel cell constructed as described above, the fuel cell consequently has a large size. Further, the operation cost is expensive for the fuel cell.

SUMMARY OF THE INVENTION

A general object of the present invention is to provide a proton conductor which exhibits high proton conductivity even under a dry condition.

A principal object of the present invention is to provide a proton conductor which does not enlarge the size of the fuel cell and increase the operation cost.

Another object of the present invention is to provide a proton conductor which has no fear of decreasing proton conductivity.

According to an embodiment of the present invention, there is provided a proton conductor comprising an acidic group-containing polymer which has an acidic group capable of dissociating proton, and a proton acceptor which has a boiling point at 1 atmosphere higher than 100° C. and which functions as a medium for conducting the proton dissociated from the acidic group, the acidic group-containing polymer and the proton acceptor being retained in pores of a porous member.

The proton acceptor functions as the medium for conducting proton, and thus the proton conduction occurs. In the present invention, the substance, which has a boiling point at 1 atmosphere higher than 100° C., is selected as the proton acceptor. That is, the proton acceptor is not easily vaporized as compared with water.

That is, in the present invention, the substance, which is not easily vaporized as compared with water, is used as the medium for the proton conduction. Therefore, for example, even when a fuel cell, which is constructed by using the proton conductor as an electrolyte, is operated at a temperature exceeding 100° C., the proton acceptor is hardly vaporized provided that the temperature is not more than the boiling point. Therefore, the fuel cell exhibits excellent proton conduction even at a temperature exceeding 100° C.

The fuel cell, which has the proton conductor as described above, requires no humidifier, because the proton acceptor is not easily vaporized. Further, the fuel cell requires no cooling system as well, because it is unnecessary to perform any cooling. That is, according to the present invention, the system of the fuel cell is simplified.

In the case of the proton conductor described above, the acidic group-containing polymer and the proton acceptor are retained in the pores in a suitable manner. Even when the proton conductor is exposed to water, the acidic group-containing polymer and the proton acceptor hardly flow out. In other words, the proton conductor is excellent in the water resistance. Therefore, even when the proton conductor is used as the electrolyte of the fuel cell in which water is produced as the fuel cell is operated, excellent proton conductivity is maintained for a long period of time.

Preferred examples of the proton acceptor firstly include a substance which has a salt structure composed of an anion and a cation derived from a basic organic compound. Alternatively, the proton acceptor may be either a basic organic compound or a dissociation-facilitating polymer which facilitates dissociation of the proton.

It is preferable that at least one of the acidic group-containing polymer and the proton acceptor forms a covalent bond with respect to inner surfaces of the pores. In this case, the acidic group-containing polymer and the proton acceptor are strongly retained in the pores. Therefore, the water resistance is further improved.

It is preferable that an ion exchange capacity (IEC) of the acidic group-containing polymer is not less than 3 mmol/g. In this case, the proton conductor, which exhibits excellent proton conductivity, is obtained.

Further, when the IEC is not less than 3 mmol/g, if the proton acceptor is the substance having the salt structure composed of the cation and the anion or the basic organic compound, then the acid-base interaction is enhanced between the acidic group-containing polymer and the proton acceptor, and the acidic group-containing polymer and the proton acceptor are attracted to each other. Therefore, even when the proton acceptor is not bonded to the inner surfaces of the pores of the porous member, the proton acceptor is remarkably suppressed from the outflow from the pores. In other words, the proton acceptor is retained in the pores in a suitable manner.

On the other hand, it is preferable that the proton acceptor is a substance which has a freezing point of less than 0° C. In this case, even under such a condition that the fuel cell is operated in a cold region in which the outside air temperature is low, the proton conductivity is maintained, because the proton acceptor is in an unsolidified state. That is, the fuel cell or the like can be operated even at a low temperature. Further, it is unnecessary to equip heaters in order to avoid the solidification of the proton acceptor. Therefore, it is possible to further simplify the apparatus structure of the fuel cell or the like.

The retention ratio of the acidic group-containing polymer and the proton acceptor in the porous member may be evaluated, for example, by comparing the weight obtained before being immersed in water with the weight obtained after being immersed in water for 3 hours. In the present invention, it is preferable that the retention ratio determined as described above is not less than 50%. If the retention ratio is less than 50%, then the acidic group-containing polymer and the proton acceptor tend to flow out with water relatively easily, and hence it is not easy to maintain the proton conductivity for a long period of time.

If the ratio of the acidic group-containing polymer and the proton acceptor to occupy the total volume of the pores is less than 20%, the so-called gas crossover sometimes occurs in which gas flows from one electrode to the other electrode when the proton conductor is used as the electrolyte of the fuel cell. In order to avoid this inconvenience, it is preferable that the acidic group-containing polymer and the proton acceptor occupy not less than 20% of the total volume of the pores.

It is preferable that 0.1 to 20 mol of the proton acceptor is provided with respect to 1 mol of the acidic group-containing polymer provided that a repeating unit, which contains one acidic group, is defined to represent 1 mol of the acidic group-containing polymer. If this range is deviated, the proton conductivity is lowered in some cases.

In any case, it is preferable that a porosity of the porous member is 20% to 95% by volume. If the porosity is less than 20% by volume, the proton conductivity is lowered in some cases, because the amounts of the acidic group-containing polymer and the proton acceptor retained in the pores are insufficient. On the other hand, if the porosity exceeds 95% by volume, the strength of the porous member is small. Therefore, the porous member may be damaged, for example, when the unit cells are mutually tightened with the tie rods when the fuel cell is constructed.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2 is a table illustrating the retention ratios and the proton conductivities of respective membranes of Examples 1 to 10 and Comparative Examples 1 to 3.

DESCRIPTION OF THE PREFERRED EMBODIMENTS

Figure 1:
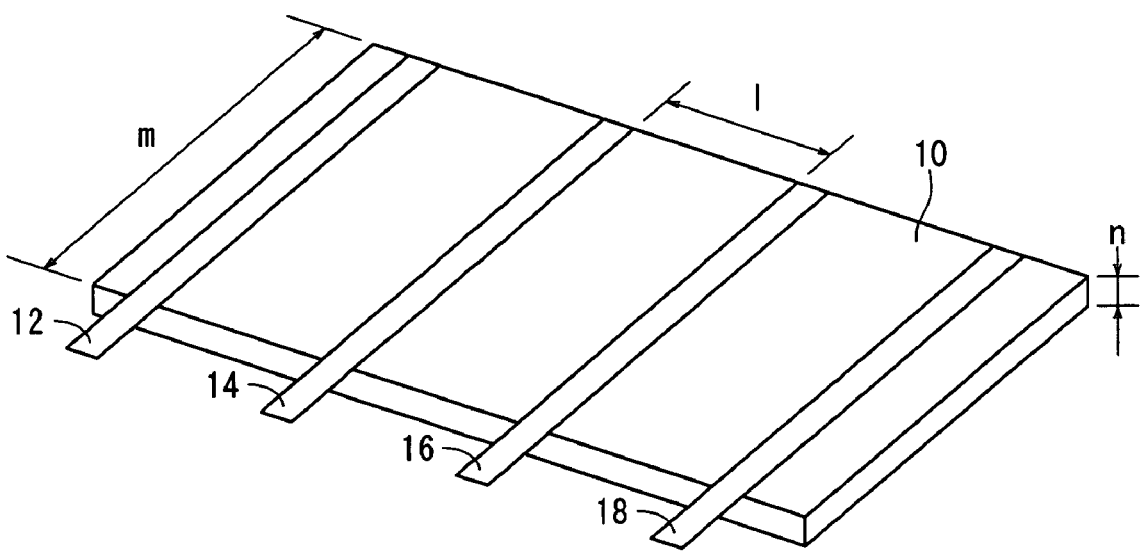
FIG. 1 is a schematic perspective view entirely illustrating a test piece and electrodes for measuring the proton conductivity of a proton conductor according to an embodiment of the present invention.

The proton conductor according to the present invention will be explained in detail below with reference to the accompanying drawings as exemplified by preferred embodiments.

A proton conductor according to an embodiment of the present invention has a matrix as a porous member. An acidic group-containing polymer having acidic group and a proton acceptor are retained in pores of the matrix.

The matrix (porous member) is not specifically limited provided that the acidic group-containing polymer and the proton acceptor can be retained in the pores. The matrix may be either an organic material including polymer or an inorganic material. Examples of the organic material include porous fluorocarbon resin such as PTFE, polyimide, polybenzoazole, polyethylene, polyamide, polyethylene terephthalate, and polyetheretherketone. Examples of the inorganic material include silicon oxide (silica), aluminum oxide (alumina), zeolite, zirconium phosphate, and glass nonwoven fabric. Of course, two or more of the materials as described above may be used simultaneously.

It is preferable that the matrix, which is composed of the material as described above, has a porosity of 20% to 95% by volume. If the porosity is less than 20% by volume, the retention amount of the acidic group-containing polymer and the proton acceptor is decreased. Therefore, the proton conductivity is lowered in some cases. On the other hand, if the porosity exceeds 95% by volume, the mechanical strength is decreased. The porosity of the matrix is more preferably 50% to 90% by volume. The pore diameter of most of the pores is within a range of $10^{-9}$ to $10^{-7}$ m.

When the proton conductor according to the embodiment of the present invention is used as an electrolyte of a solid polymer electrolyte type fuel cell, it is preferable that the thickness of the matrix is set to about 100 μm in the same manner as in the use of a perfluorosulfonic acid polymer membrane.

As described above, the acidic group-containing polymer and the proton acceptor are retained in the pores of the matrix. In particular, the term "acidic group-containing polymer" means the polymer having the acidic group. The acidic group-containing polymer of the present invention also includes a substance in which the acidic group is bonded to fullerene which is a spherical molecule based on the π-electron conjugated system composed of a plurality of carbon atoms.

The acidic group is herein a functional group which functions as Brønsted acid capable of supplying proton. That is, the acidic group-containing polymer exhibits acidity.

The acidic group is not specifically limited provided that the acidic group is Brønsted acid. However, preferred examples include, for example, sulfonic acid group, sulfonylimide group, phosphoric acid group, phosphonic acid group, and carboxyl group.

Any substance, in which the ion exchange capacity (IEC) is not less than 3 mmol/g, is preferred as the acidic group-containing polymer. In this case, the proton conductor exhibits satisfactory proton conductivity even under a dry condition in which the humidity is low. When the proton acceptor is a basic organic compound or a substance having a salt structure of cation and anion, the acid-base interaction is increased between the proton acceptor and the acidic group-containing polymer. Accordingly, the proton acceptor and the acidic group-containing polymer are attracted to each other. Therefore, even when the proton acceptor is not bonded to the inner surfaces of the pores of the porous member, the proton acceptor is extremely suppressed from the outflow from the pores. Accordingly, it is possible to avoid the decrease in the proton conductivity.

Specified examples of the acidic group-containing polymer which has the functional group as described above and which has the IEC of not less than 3 mmol/g include perfluorosulfonic acid polymers represented by the following structural formula (1) and various polymers having a general formula represented by the following structural formula (2).

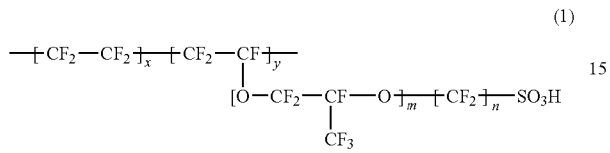

(1)

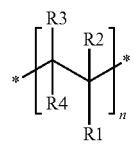

(2)

R1 = $C_6H_4SO_3H$, $CONHC(CH_3)_2CH_2SO_3H$, $SO_3H$, $PO_3H_2$
R2 = H, $CH_3$, F
R3 = H, F
R4 = H, F

In the structural formula (2), R1 is any one of $C_6H_4SO_3H$, $CONHC(CH_3)_2CH_2SO_3H$, $SO_3H$, and $PO_3H_2$. R2 is any one of H, $CH_3$, and F. R3 and R4 are any one of H and F independently respectively. Specified examples of such a polymer include polystyrenesulfonic acid polymer, acrylamide methanepropanesulfonic acid polymer, vinylsulfonic acid polymer, and vinylphosphonic acid polymer.

Alternatively, copolymers of various polymers represented by the structural formula (2) and various polymers represented by the following structural formula (3) may also be used.

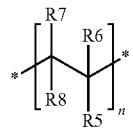

(3)

R5 = H, $CH_3$, phenyl, COOH, COOMe, CN, F
R6 = H, $CH_3$, F
R7 = H, F
R8 = H, F In the structural formula (3), R5 is any one of H, $CH_3$, $C_6H_5$ (phenyl group, hereinafter referred to as "Ph" as well), COOH, $COOCH_3$(COOMe), CN, and F. R6 is any one of H, $CH_3$, and F. R7 and R8 are any one of H and F independently respectively.

The acidic group-containing polymer may be a fullerene derivative represented by the following structural formula (4).

$C_{60}$—$R_n$ (4)

R=$SO_3H$, $PO_3H_2$, $PO_4H_2$
n=1-20

Alternatively, the acidic group-containing polymer may be polymers represented by the following structural formulas (5) and (6).

(5)

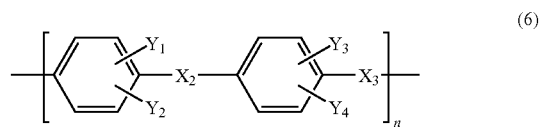

(6)

In the structural formulas (5) and (6), X1, X2, and X3 are any one of S, $SO_2$, O, CO, and $CH_2$. X2 and X3 may be the same, or they may be different from each other. On the other hand, at least one of Y1, Y2, Y3, and Y4 is any one of $SO_3H$, $OPO(OH)_2$, and $PO(OH)_2$. Y1 and Y2, and Y3 and Y4 may be bonded at any position provided that they do not participate in the principal chain bond of the polymer. In the following explanation, the same symbols are used when the functional groups are the same.

Other preferred examples of the acidic group-containing polymer include substances represented by the following structural formulas (7) and (8).

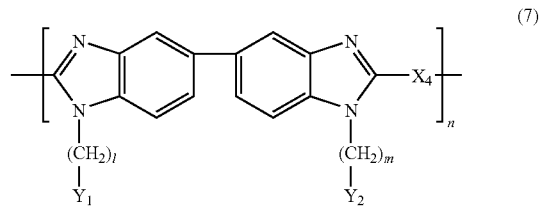

(7)

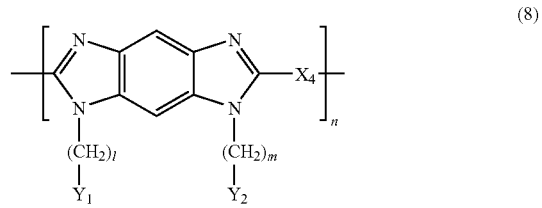

(8)

In the structural formulas (7) and (8), l and m are integers of 1 to 10, which may be the same number or different numbers. X4 has any one of the following structures.

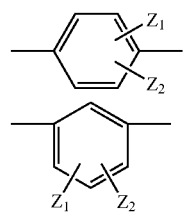

In the formulas, Z1 and Z2 are functional groups selected from H, $SO_3H$, $OPO(OH)_2$, and $PO(OH)_2$ independently respectively.

A substance having a structure from which X4 is omitted may be also used.

Other preferred examples of the acidic group-containing polymer include substances represented by the following structural formulas (9) and (10).

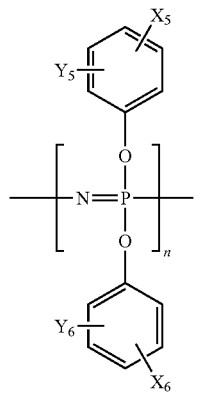
(9)

In the structural formula (9), X5 is SO$_3$H, and X6 is any one of H and SO$_3$H. Y5 and Y6 are functional groups selected from H, CH$_3$, C$_2$H$_5$, F, Cl, and Br independently respectively.

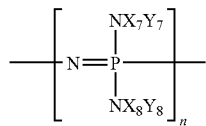
(10)

In the structural formula (10), X7 is (CH$_2$)$_m$SO$_3$H (m=integer of 1 to 10). X8 is any one of (CH$_2$)$_m$SO$_3$H (m=integer of 1 to 10), NH$_2$, H, CH$_3$, C$_2$H$_5$, and Ph. Y7 and Y8 are functional groups selected from H, CH$_3$, C$_2$H$_5$, and Ph independently respectively.

On the other hand, the proton acceptor functions as the medium for conducting the proton dissociated from the acidic group of the acidic group-containing polymer. The substance, which has a boiling point at 1 atmosphere higher than 100° C., is selected for the proton acceptor. It is preferable to use the substance which has a freezing point less than 0° C.

First examples of the proton acceptor include substances having the salt structure composed of cation and anion. In particular, the cation is not specifically limited provided that the cation is a substance derived from a basic organic compound. Specified examples thereof include cations of various amines derived from nitrogen-containing organic compounds and heterocyclic amines, and cations derived from polymers in which the cation structures as described above are bonded to principal chains or side chains of the polymers. One or more functional groups such as alkyl group, ether group, carbonyl group, ester group, and hydroxyl group may be bonded thereto as the side chain.

When the substance has the side chain, it is preferable that the terminal is a highly reactive functional group such as radical reactive functional group, silane alkoxide, and ion reactive functional group, for the following reason. That is, the reactive functional group as described above forms the covalent bond together with the inner surfaces of the pores of the matrix. Therefore, the proton acceptor is retained in the pores in a suitable manner.

The cation is exemplified by imidazolium cation, pyridium cation, pyrrolidium cation, cation derived from alicyclic amine, and cation derived from aliphatic amine represented by the structural formulas (11) to (15) respectively.

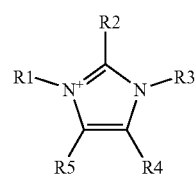
(11)

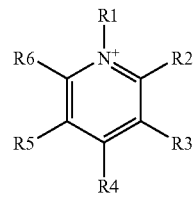
(12)

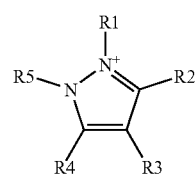
(13)

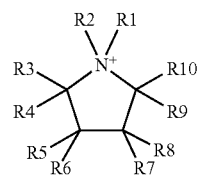
(14)

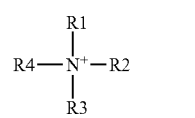
(15)

In the structural formulas (11) to (15), R1 to R10 are C$_n$H$_{2n}$A, OC$_n$H$_{2n}$A, (OC$_2$H$_4$)$_n$A, and/or (OC(CH$_3$)CH$_2$)$_n$A. A is any one of H, CH=CH$_2$, OH, OCH$_3$, Si(OCH$_3$)$_3$, COOH, CHO, and Cl, and n is an integer of 0 to 10.

The cation derived from the polymer includes cations represented by the structural formulas (16) and (17).

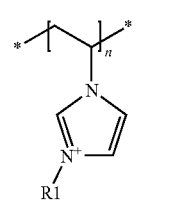
(16)

-continued

(17)
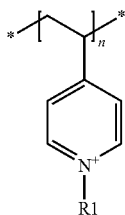

In the structural formulas (16) and (17), R1 is the same as R1 (to R10) in the structural formulas (11) to (15) described above.

The anion, which forms the salt structure together with the cation as described above, may be an organic anion containing anion derived from polymer such as perfluorosulfonic acid polymer. Alternatively, the anion may be an inorganic anion. However, an anion derived from a strongly acidic substance is preferred.

Preferably, the anion may be bonded to a highly reactive functional group such as an ion reactive functional group and a radical reactive functional group having carbon-carbon double bond such as olefin and perfluoroolefin, for the following reason. That is, the proton acceptor is satisfactorily retained in the pores by the aid of the covalent bond formed between the reactive functional group and the inner surfaces of the pores of the matrix in the same manner as described above.

The organic anion includes, for example, organic compounds bonded with functional groups such as $C_nF_{2n+1}SO_3^-$, $C_nF_{2n+1}SO_2—N^-—SO_2\ C_mF_{2m+1}$, $(CF_3SO_2)_3C^-$, and $C_nF_{2n+1}OO^-$, and substances represented by the structural formulas (18) to (20).

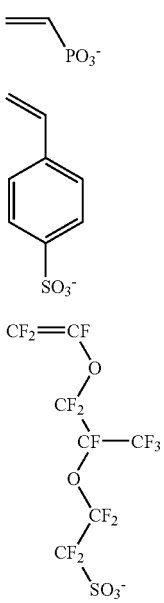

Further, an organic anion derived from polymer as represented by the structural formula (21) may also be used.

(21)
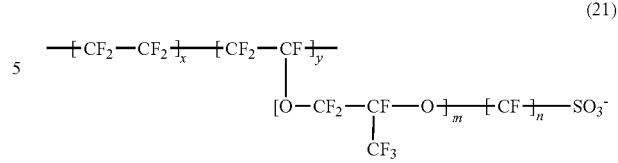

Further, specified examples of the inorganic anion include $BF_4^-$, $PF_6^-$, $AsF_6^-$, $SbF_6^-$, $ClO_4^-$, $H(HF)_n^-$, $H_2PO_4^-$, and $HSO_4^-$.

Second examples of the proton acceptor include basic organic compounds. Specifically, there are exemplified various nitrogen-containing organic compounds such as imidazole, pyrazole, pyridine, and amine. As shown in the following structural formulas (22) to (26), one or more functional groups such as alkyl group, ether group, carbonyl group, ester group, and hydroxyl group may be bonded thereto as the side chain.

When the substance has the side chain, it is preferable that the terminal is a highly reactive functional group such as radical reactive functional group, silane alkoxide, and ion reactive functional group, for the following reason. That is, the reactive functional group as described above forms the covalent bond together with the inner surfaces of the pores of the matrix. Therefore, the proton acceptor is retained in the pores in a suitable manner.

Of course, a basic polymer having the nitrogen-containing organic compound as described above as the principal chain or the side chain of the polymer may also be used. Such a basic polymer is exemplified by substances represented by the following structural formulas (27) and (28).

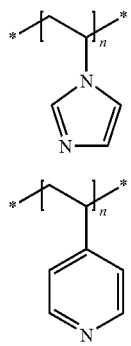

(27)

(28)

Third examples of the proton acceptor include dissociation-facilitating polymers to facilitate the dissociation of proton from the acidic group. The dissociation-facilitating polymer includes oligomers.

The polymer as described above is firstly exemplified by substances having principal chain skeletons which contribute to facilitate the proton dissociation, specifically by polyethylene glycol and polyethylene carbonate represented by the following structural formulas (29) and (30).

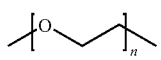

(29)

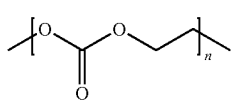

(30)

It is also allowable to use a substance in which a part or all of hydrogen atoms of the polymer as described above are substituted with fluorine atoms as in polytetrafluorobutylene carbonate represented by the structural formula (31). In this case, the heat resistance is improved, which is preferred.

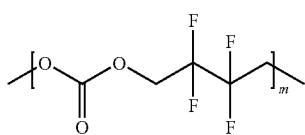

(31)

The dissociation-facilitating polymer may be also a substance in which a functional group to facilitate the proton dissociation is bonded as a side chain. Examples of such a functional group include hydroxyl group and amide group.

In this case, the principal chain structure is not specifically limited. However, it is preferable to adopt a structure having a form in which a monomer having carbon-carbon double bond is polymerized, for the following reason. That is, in this case, when the monomer is polymerized to form the dissociation-facilitating polymer, a part of the double bond forms the covalent bond together with the inner surfaces of the pores of the matrix. Therefore, the proton acceptor is retained in the pores in a suitable manner.

Specified examples of the polymer as described above include, for example, polyvinyl alcohol and polyvinylacetamide represented by the following structural formulas (32) and (33) respectively.

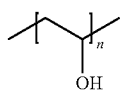

(32)

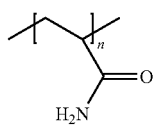

(33)

It is preferable that the acidic group-containing polymer and the proton acceptor as described above occupy not less than 20% of a total volume of the pores. If the volume occupied thereby is less than 20%, the so-called gas crossover occurs in some cases such that the reaction gas passes through the proton conductor (electrolyte). Further, the proton conductivity of the proton conductor is decreased in other cases.

As for the ratio between the acidic group-containing polymer and the proton acceptor, it is preferable that the proton acceptor is 0.1 to 20 mol with respect to 1 mol of the acidic group-containing polymer. If the ratio of the proton acceptor is less than 0.1 mol, the proton conductivity is decreased, because the substance for receiving the proton is decreased. On the other hand, if the ratio of the proton acceptor exceeds 20 mol, the amount of conducting proton is decreased, because the acidic group-containing polymer is decreased. Consequently, the proton conductivity is decreased.

It is defined that 1 mol of the acidic group-containing polymer is a repeating unit containing one acidic group. On the other hand, as for the proton acceptor, it is defined that a repeating unit containing one functional group is 1 mol only when the proton acceptor is a polymer having the functional group to receive the dissociated proton. In the case of any substance other than the above, 1 mol is affirmed when the number of molecules is the Avogadro's number in accordance with the ordinary definition.

In the proton conductor according to the embodiment of the present invention, the matrix is excellent in the ability to retain the acidic group-containing polymer and the proton acceptor. Therefore, the acidic group-containing polymer and the proton acceptor are prevented from disengaging from the matrix. Accordingly, the proton conductor exhibits excellent proton conductivity for a long period of time.

The ability of the proton conductor to retain the acidic group-containing polymer and the proton acceptor is evaluated by the retention ratio which is determined from the weight change of the proton conductor before and after the immersion, by immersing the proton conductor in water for 3 hours. In the embodiment of the present invention, the retention ratio of the proton conductor is not less than 50%. The proton conductors, which exhibit 90% or 100%, are also provided.

When the proton conductor constructed as described above is used as the electrolyte of the fuel cell, the fuel gas containing hydrogen is supplied to the anode of the fuel cell, while the oxygen-containing gas containing oxygen is supplied to the cathode. During this process, hydrogen is ionized into proton and electron on the anode.

In particular, the electron is taken out of the fuel cell system, and the electron is used as the DC electric energy to drive the external load. After that, the electron arrives at the cathode. On the other hand, the proton arrives at one end surface of the proton conductor, and the proton is substituted with the proton existing in the acidic group such as the sulfonic acid group. The proton, which is released by the substitution, is subsequently moved in the pores of the matrix by the aid of the proton acceptor. The proton is finally moved to the other end surface of the proton conductor, and the proton arrives at the cathode. The proton is reacted with the electron together with oxygen contained in the oxygen-containing gas supplied to the cathode. As a result, water is produced.

The water makes contact with the proton conductor as the electrolyte. However, the matrix, which constitutes the proton conductor, has extremely excellent ability of retention. Therefore, it is possible to remarkably suppress the deprivation of the acidic group-containing polymer and the proton acceptor from the matrix even when water is in contact therewith. In other words, even when water makes contact with the proton conductor, the acidic group-containing polymer and the proton acceptor are prevented from flowing out from the matrix.

That is, according to the proton conductor concerning the embodiment of the present invention, the acidic group-containing polymer and the proton acceptor are prevented from flowing out even in the case of the contact with water. Therefore, the proton conductivity is maintained.

Further, the proton acceptor, which is retained by the proton conductor, has the boiling point at 1 atmosphere higher than 100° C. Therefore, even when the operation temperature of the fuel cell is not less than 100° C., no vaporization occurs provided that the temperature is not more than the boiling point. Therefore, the proton conductivity is not lowered as well.

When the substance, which has the freezing point less than 0° C., is selected as the proton acceptor, the proton acceptor is not easily solidified even when the fuel cell is operated under a condition in which the ambient temperature is low as in the cold region or the like. Therefore, it is possible to avoid the deterioration of the proton conductivity. That is, the proton conductor is provided, which exhibits excellent proton conductivity even at low temperatures.

As described above, according to the embodiment of the present invention, the proton conductivity is not lowered even when the fuel cell is operated in a low humidity environment while the operation temperature of the fuel cell is not less than 100° C. That is, the proton conductivity, which is obtained when the fuel cell is operated in a low humidity state at a high temperature, is substantially equivalent to the proton conductivity which is obtained when the fuel cell is operated in a high humidity state at a low temperature. Therefore, when the fuel cell is constructed by using the proton conductor as the electrolyte, it is unnecessary to equip the humidifier, the heater, and the cooling system. Therefore, it is possible to miniaturize the fuel cell.

It is also allowable that the proton conductor is used as an electrolyte for any electrochemical cell other than the fuel cell, including, for example, a hydrogen and oxygen generator for producing hydrogen and oxygen by electrolyzing water.

As described above, the proton conductor according to the embodiment of the present invention comprises the acidic group-containing polymer and the proton acceptor which are retained in the pores of the matrix. Such a proton conductor can be produced in accordance with the following first to third production methods.

At first, an explanation will be made about the first production method in which the acidic group-containing polymer is retained in the pores, and then the proton acceptor is retained.

When the acidic group-containing polymer is a liquid, the porous member as the matrix is immersed in the liquid. The acidic group-containing polymer may be diluted with an appropriate organic solvent such as ethanol and dimethylacetamide (DMAc).

When the acidic group-containing polymer is a solid, then the solid may be dissolved, for example, in ethanol or DMAc to prepare a solution, and the matrix may be immersed in the solution.

A method other than the immersion is also available, which includes such a technique that the aspiration is performed from one end surface side of the porous member, while the liquid acidic group-containing polymer or the solution in which the solid acidic group-containing polymer is dissolved is supplied from the other end surface side, and thus the liquid or the solution is permeated into the porous member.

In any case, when the solvent is used, the solvent may be evaporated and removed by effecting the heating or reducing the pressure after the acidic group-containing polymer is retained in the pores.

Alternatively, a monomer, which serves as the repeating unit of the acidic group-containing polymer, may be retained in the pores, and then the monomer may be polymerized. In this procedure, for example, the monomer and the polymerization initiator may be dissolved in a solvent to prepare a solution. The porous member may be immersed in the solution. Alternatively, the solution may be permeated into the porous member by effecting the aspiration from one end surface side of the porous member while supplying the solution from the other end surface side.

A cross-linking agent may be previously added to the solution, if necessary. In this case, the acidic group-containing polymer forms a cross-linked structure when the monomer is polymerized to form the acidic group-containing polymer. Therefore, the solubility in water is decreased. As a result, the outflow of the acidic group-containing polymer from the pores is further prevented, which is preferred.

After that, when the heat treatment is applied to the porous member, then the monomer is polymerized, and the acidic group-containing polymer is produced. The solvent may be evaporated and removed by effecting the heating or reducing the pressure after the acidic group-containing polymer is produced and retained in the pores.

Alternatively, polymerization initiation points may be firstly formed on the inner surfaces of the pores, and then the monomer having the acidic group may be introduced into the pores to effect the polymerization. That is, the plasma, the γ-ray, the electron beam, the ultraviolet ray or the like is radiated onto the porous member. Accordingly, radicals are produced on the inner surfaces of the pores of the porous member. A radical-polymerizable monomer is dissolved in a solvent to prepare a solution. The porous member is immersed in the solution, or the aspiration is performed from one end surface side of the porous member, while the solution is supplied from the other end surface side. Accordingly, the solution is permeated into the porous member. As a result, the radical-polymerizable monomer is polymerized from the sources of the radicals produced on the inner surfaces of the pores to form the covalent bond between the acidic group-containing polymer and the inner surfaces of the pores. Therefore, the acidic group-containing polymer is strongly retained in the pores.

The means, by which the covalent bond is formed between the acidic group-containing polymer and the inner surfaces of the pores, is not especially limited to the radical polymerization. It is also allowable to adopt any other means such as the ionic polymerization. Of course, it is also allowable to use a plurality of means to form the covalent bond in combination.

The covalent bond between the acidic group-containing polymer and the inner surfaces of the pores can be also formed such that the acidic group-containing polymer or the monomer is introduced into the pores in accordance with the technique as described above, and then the γ-ray is radiated onto the introduced acidic group-containing polymer or the acidic group-containing polymer produced by polymerizing the monomer. As the γ-ray is radiated, the cross-linking reaction occurs between the acidic group-containing polymer and the inner surfaces of the pores. As a result, the covalent bond is formed between the acidic group-containing polymer and the inner surfaces of the pores. A solution may be prepared by dissolving the acidic group-containing polymer or the monomer and the cross-linking agent in a solvent.

The acidic group-containing polymer may be retained in the pores in a stepwise manner by appropriately combining two or more of the techniques described above. Of course, it is also allowable to repeat one technique a plurality of times.

The proton acceptor is retained in the pores after the acidic group-containing polymer is retained in the pores as described above. When the proton acceptor is a liquid, the matrix may be immersed in an undiluted solution or a diluted solution in the same manner as that performed for the acidic group-containing polymer. Alternatively, the aspiration may be performed from one end surface side of the porous member, while the undiluted solution or the diluted solution may be supplied from the other end surface side, and thus the solution is permeated into the porous member. When the proton acceptor is a solid, a solution is prepared by dissolving the proton acceptor. The matrix may be immersed in the solution. Alternatively, the aspiration may be performed from one end surface side of the porous member, while the solution is supplied from the other end surface side. Thus, the solution is permeated into the porous member. Ethanol or DMAC may be used as the solvent.

The substance having the salt structure which possesses cation derived from the polymer or anion derived from the polymer, the basic polymer, or the dissociation-facilitating polymer may be selected as the proton acceptor. In this case, a monomer, which serves as the repeating unit of the polymer as described above, may be retained in the pores, and then the monomer may be polymerized. In this procedure, the monomer and the polymerization initiator are dissolved in a solvent to prepare a solution. The porous member is immersed in the solution. Alternatively, the solution is permeated into the porous member by effecting the aspiration from one end surface side of the monomer and the porous member while supplying the solution from the other end surface side.

A cross-linking agent may be previously added to the solution, if necessary. In this case, a cross-linked structure is formed in the proton acceptor when the monomer is polymerized to make the change into the proton acceptor. Accordingly, the solubility in water is decreased. Therefore, the outflow of the proton acceptor from the pores is extremely suppressed. In other words, an advantage is obtained such that the proton acceptor is satisfactorily retained in the pores.

Subsequently, when the heat treatment is applied to the porous member, then the monomer is polymerized, and the proton acceptor is produced. The solvent may be evaporated and removed by effecting the heating or reducing the pressure after the proton acceptor is produced and retained in the pores.

When the covalent bond is formed between the proton acceptor and the inner surfaces of the pores, the same procedure as that adopted for the acidic group-containing polymer may be adopted. That is, the plasma, the γ-ray, the electron beam, the ultraviolet ray or the like is radiated onto the porous member. Accordingly, radicals as polymerization initiation points are produced on the inner surfaces of the pores of the porous member. After that, a radical-polymerizable monomer, which serves as the repeating unit of the proton acceptor, is dissolved in a solvent to prepare a solution. The porous member is immersed in the solution, or the aspiration is performed from one end surface side of the porous member, while the solution is supplied from the other end surface side. Accordingly, the solution is permeated into the porous member. As a result, the radical polymerization occurs while using start points of radicals produced on the inner surfaces of the pores. Thus, the proton acceptor is produced, in which the radical-polymerizable monomer is polymerized. In this case, the covalent bond is formed between the proton acceptor and the inner surfaces of the pores. Therefore, the proton acceptor is strongly retained in the pores. The means, by which the covalent bond is formed between the proton acceptor and the inner surfaces of the pores, is not especially limited to the radical polymerization. It is also allowable to adopt any other means such as the ionic polymerization. Of course, it is also allowable to use a plurality of means to form the covalent bond in combination.

Alternatively, the following procedure is also available. That is, the proton acceptor or the monomer is introduced into the pores in accordance with the technique as described above, and then the γ-ray is radiated onto the introduced proton acceptor or the proton acceptor produced by polymerizing the monomer to form the covalent bond between the proton acceptor and the inner surfaces of the pores. Also in this case, as the γ-ray is radiated, the cross-linking reaction occurs between the proton acceptor and the inner surfaces of the pores. As a result, the covalent bond is formed between the proton acceptor and the inner surfaces of the pores. Of course, a solution may be prepared by dissolving the proton acceptor or the monomer and the cross-linking agent in a solvent.

The proton acceptor may be retained in the pores in a stepwise manner by appropriately combining two or more of the techniques described above. Of course, it is also allowable to repeat one technique a plurality of times.

The acidic group-containing polymer and the proton acceptor are retained in the pores of the matrix as described above.

Next, an explanation will be made about a second production method in which the proton acceptor is retained in the pores, and then the acidic group-containing polymer is retained.

In the second production method, the first production method may be carried out in accordance with a reverse sequence. That is, the proton acceptor may be retained in the pores by means of any one of the various techniques as described above, and then the acidic group-containing polymer may be retained.

Next, an explanation will be made about a third production method in which the acidic group-containing polymer and the proton acceptor are simultaneously retained in the pores.

When both of the acidic group-containing polymer and the proton acceptor are liquids, then a mixed liquid of the both may be prepared, and the matrix may be immersed in the mixed liquid. The mixed liquid may be diluted with an appropriate organic solvent such as ethanol and DMAc.

When any one of or both of the acidic group-containing polymer and the proton acceptor is/are a solid or solids, the solid or solids may be dissolved, for example, in ethanol or DMAc to prepare a mixed solution. The matrix may be immersed in the mixed solution.

Alternatively, they may be permeated into the porous member by performing the aspiration from one end surface side of the porous member while supplying the mixed solution from the other end surface side.

In any case, when the solvent is used, the solvent may be evaporated and removed by effecting the heating or reducing the pressure after the acidic group-containing polymer and the proton acceptor are retained in the pores.

Of course, also in the third production method, any one of or both of the acidic group-containing polymer and the proton acceptor may be subjected to the radical polymerization or the ionic polymerization in the pores, and any cross-linked product may be formed.

EXAMPLE 1

1 mol of acrylamide-methanepropanesulfonic acid (AMPS), 0.05 mol of azobisisobutylonitrile (AIBN) as a polymerization initiator, and 1 mol of 1-ethyl-3-methylimidazolium trifluoromethane-sulfonate (EMI-TF) as a salt structure of cation and anion were dissolved in 2 mol of ethanol to prepare a solution.

A porous PTFE membrane, which has a length of 3 cm, a width of 3 cm, and a thickness of 50 μm, was immersed in this solution for 60 minutes, followed by being dried under reduced pressure at room temperature to remove the solvent. This operation was repeated five times to retain AMPS, AIBN, and EMI-TF in pores of the porous PTFE membrane.

Subsequently, the porous PTFE membrane was heated for 6 hours at 60° C. in an Ar atmosphere to polymerize AMPS under the polymerizing action of AIBN.

Accordingly, a proton conductor was obtained, in which the AMPS polymer as an acidic group-containing polymer and EMI-TF as a proton acceptor were retained in the pores of the porous PTFE membrane (matrix).

EXAMPLE 2

A proton conductor, in which the AMPS polymer and EMI-TF were retained in the pores of the porous PTFE membrane, was obtained in the same manner as in Example 1 except that the amount of EMI-TF to be dissolved was 3 mol.

EXAMPLE 3

A proton conductor, in which polystyrenesulfonic acid and EMI-TF were retained in the pores of the porous PTFE membrane, was obtained in the same manner as in Example 1 except that 1 mol of styrenesulfonic acid was dissolved in place of AMPS.

EXAMPLE 4

A proton conductor, in which the AMPS polymer and EMI-TF were retained in pores of a porous polyimide membrane, was obtained in the same manner as in Example 1 except that the porous polyimide membrane was used as a matrix.

EXAMPLE 5

A proton conductor, in which the AMPS polymer and EMI-TF were retained in pores of a porous silica membrane, was obtained in the same manner as in Example 1 except that the porous silica membrane, which has a length of 3 cm, a width of 3 cm, and a thickness of 1 mm, was used as a matrix.

EXAMPLE 6

1 mol of AMPS was dissolved in 1 mol of vinylimidazole as a basic organic compound to prepare a solution. On the other hand, a porous PTFE membrane was washed with acetone, and then the plasma radiation was applied to the porous PTFE membrane under a condition of a high frequency output of 30 W and a radiation time of 60 seconds in an argon atmosphere at a pressure of 100 Pa.

Subsequently, the porous PTFE membrane was immersed in the solution for 60 minutes, and the membrane was taken out therefrom, followed by being heated for 10 hours at 60° C. in an argon atmosphere. Accordingly, AMPS and vinylimidazole caused the radical polymerization. As a result, a copolymer of AMPS polymer and polyvinylimidazole was produced with initiation points of the portions irradiated with the plasma, and the covalent bond was formed between the copolymer and inner surfaces of pores of the porous PTFE membrane.

Accordingly, a proton conductor was obtained, in which the AMPS polymer as an acidic group-containing polymer and polyvinylimidazole as a proton acceptor were retained in the pores of the porous PTFE membrane.

EXAMPLE 7

1 mol of AMPS was mixed with 1 mol of EMI-TF to prepare a mixed solution. On the other hand, the γ-ray of $^{60}$Co was radiated onto a porous polypropylene membrane under a condition of a γ-ray absorption amount of 20 Mrad. Accordingly, the radical was generated on inner surfaces of pores of the porous polypropylene membrane.

Subsequently, the porous polypropylene membrane was immersed in the mixed solution for 60 minutes while effecting the defoaming, and then the membrane was taken out, followed by being maintained for 10 hours at 25° C. in an argon atmosphere. Accordingly, AMPS caused the radical polymerization. Thus, AMPS polymer was produced with initiation points of the radical, and the covalent bond was formed between the AMPS polymer and inner surfaces of pores of the porous polypropylene membrane.

Accordingly, a proton conductor was obtained, in which the AMPS polymer as an acidic group-containing polymer and EMI-TF as a proton acceptor were retained in the pores of the porous polypropylene membrane.

EXAMPLE 8

A proton conductor, in which the AMPS polymer and EMI-TF were retained in the pores of the porous polyimide membrane, was obtained in accordance with the same method as that used in Example 4. The γ-ray of $^{60}$Co was radiated onto the proton conductor under a condition of a γ-ray absorption amount of 20 Mrad to effect the radical cross-linking of the AMPS polymer. As a result of the cross-linking reaction, the covalent bond was formed between the cross-linked product of the AMPS polymer and the inner surfaces of the pores of the porous polyimide membrane.

EXAMPLE 9

62 g of ethylene glycol, 118 g of diethyl carbonate, and 270 mg of sodium methoxide as a catalyst were introduced into a flask having a volume of 500 ml equipped with a cooling tube and a water quantifying unit, followed by being left to stand all day and night at 80° C. and then being left to stand for 5 hours at 100° C. to perform the polymerization reaction of ethylene glycol.

The cooling tube and the water quantifying unit were removed, and the heating was performed for 8 hours at 150° C. under reduced pressure to complete the polymerization reaction. An obtained solution was treated with ion exchange resin to separate and remove sodium methoxide, followed by being dried to obtain polyethylene carbonate.

A proton conductor, in which the AMPS polymer and polyethylene carbonate as a proton acceptor were retained in the pores of the porous PTFE membrane, was obtained in the same manner as in Example 1 except that 8 mol of polyethylene carbonate was used in place of 1 mol of EMI-TF.

EXAMPLE 10

5.7 g of ethylene glycol, 15 g of 2,2,3,3-tetrafluorobutylene-1,4-diol, 22 g of diethyl carbonate, and 50 mg of sodium methoxide were introduced into a flask having a volume of 300 ml equipped with a cooling tube and a water quantifying unit, followed by being left to stand all day and night at 80° C. and then being left to stand for 5 hours at 100° C. to perform the copolymerization reaction of ethylene glycol and 2,2,3, 3-tetrafluorobutylene-1,4-diol.

The cooling tube and the water quantifying unit were removed, and the heating was performed for 8 hours at 150° C. under the reduced pressure to complete the copolymerization reaction. An obtained solution was treated with ion exchange resin to separate and remove sodium methoxide, followed by being dried to obtain polyethylene carbonate-tetrafluorobutylene carbonate copolymer having the structural formula represented as follows.

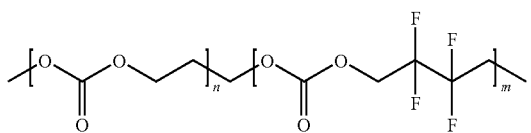

A proton conductor, in which the AMPS polymer and the polyethylene carbonate-tetrafluorobutylene carbonate copolymer as a proton acceptor were retained in the pores of the porous PTFE membrane, was obtained in the same manner as in Example 1 except that 13 mol of the copolymer was used in place of 1 mol of EMI-TF.

COMPARATIVE EXAMPLE 1

1 mol of AMPS and 0.05 mol of AIBN were dissolved in 2 mol of ethanol to prepare a solution. After that, a membrane, in which only the AMPS polymer as the acidic group-containing polymer was retained in the pores of the porous PTFE membrane and no proton acceptor was retained therein, was obtained in the same manner as in Example 1 except that the foregoing solution was used.

COMPARATIVE EXAMPLE 2

A hydrophilic porous PTFE member having a thickness of 50 μm was immersed in a water/ethanol mixed solution containing perfluorosulfonic acid polymer by 5% by weight, followed by being dried at 80° C. to remove water/ethanol. This operation was repeated five times, followed by being left to stand for 3 hours in a constant temperature and humidity tank at 95° C. at a relative humidity of 90% to introduce water into pores. Thus, a membrane was obtained, in which the perfluorosulfonic acid polymer as the acidic group-containing polymer and water were retained in the pores of the porous PTFE membrane, and no proton acceptor was retained therein.

COMPARATIVE EXAMPLE 3

1 mol of EMI-TF was added to a 5% ethanol solution containing 1 mol of AMPS polymer, which was poured into a glass petri dish. The solution was dried by being left to stand at 40° C. for 6 hours and then being left to stand at 100° C. for 2 hours to obtain a complex membrane in which the AMPS polymer and EMI-TF were subjected to the complex formation.

A test piece 10 of 10 mm×30 mm was cut out from each of the membranes of Examples 1 to 10 and Comparative Examples 1 to 3 described above, to which an acting electrode 12, a first reference electrode 14, a second reference electrode 16, and a counter electrode 18 were attached as shown in FIG. 1 to measure the proton conductivities at −10° C. and 160° C. by the AC complex impedance method. Impedance Analyzer SI-1260 produced by Solartron was used as a measuring apparatus.

The proton conductivity was determined in accordance with the following calculating formula (i). In the calculating formula (i), $\delta$ represents the proton conductivity (S/cm), R represents the resistance ($\Omega$), l represents the distance (cm) between the electrodes, m represents the widthwise dimension (cm) of the test piece 10, and n represents the thickness (cm) of the test piece 10.

$$\delta = 1/(R \times m \times n) \tag{i}$$

$\delta$ [S/cm]: proton conductivity, R [$\Omega$]: resistance, l [cm]: distance between electrodes, m [cm]: width, n [cm]: thickness.

FIG. 2 shows the proton conductivities of the respective membranes. According to FIG. 2, it is clear that the membranes (proton conductors) of Examples 1 to 10, in which both of the acidic group-containing polymer and the proton acceptor exist, exhibit excellent proton conductivities than the membranes of Comparative Examples 1 and 2 each of which has only the acidic group-containing polymer.

According to FIG. 2, it is also clear that the membranes of Examples 1 to 10 exhibit excellent proton conductivities over the wide temperature range as compared with the ordinary perfluorosulfonic acid polymer membrane. This means, for example, that a fuel cell, which uses the membrane as the electrolyte, can be operated over a wide temperature range.

Next, the weights W1 of the respective membranes of Examples 1 to 10 and Comparative Examples 1 to 3 were measured. Each of the membranes was immersed in 100 ml of pure water at 80° C., followed by being left to stand at room temperature for 3 hours. After that, the membranes were taken out from the water, and the weights W2 were measured after wiping off water on the surfaces of the membranes. The retention ratio of the acidic group-containing polymer and the proton acceptor was calculated from W1 and W2 in accordance with the following calculating formula (ii). Obtained results are shown in FIG. 2. According to FIG. 2, it is understood that the respective membranes of Examples 1 to 10 are remarkably excellent in the retention ratio as compared with the membrane of Comparative Example 3, in other words, the respective membranes of Examples 1 to 10 are superior in water resistance.

$$\text{Retention ratio (\%)} = W2/W1 \times 100 \tag{ii}$$

That is, the respective membranes of Examples 1 to 10 have such characteristics that excellent proton conductivity is exhibited over a wide temperature range, and the acidic group-containing polymer and the proton acceptor do not easily flow out to water. Therefore, the respective membranes of Examples 1 to 10 are preferred as the electrolyte of the fuel cell.

Further, according to FIG. 2, when Example 4 is compared with Example 8, it is clear that the retention ratio (water resistance) is remarkably improved by providing the covalent bond as the cross-linking between the matrix and the substance retained in the pores of the matrix provided that the matrix and the substance retained in the pores of the matrix are identical.

The proton conductor according to the present invention is preferably usable as the electrolyte of the electrochemical cell such as the fuel cell and the electrolysis apparatus.

Although certain preferred embodiments of the present invention have been shown and described in detail, it should be understood that various changes and modifications may be made therein without departing from the scope of the appended claims.

What is claimed is:

1. A proton conductor comprising an acidic group-containing polymer which has an acidic group capable of dissociating a proton, and a proton acceptor which has a boiling point at 1 atmosphere higher than 100° C. and which functions as a medium for conducting said proton dissociated from said acidic group, said acidic group-containing polymer and said proton acceptor being retained in pores of a porous member.

2. The proton conductor according to claim 1, wherein said proton acceptor is a substance which has a salt structure composed of an anion and a cation derived from a basic organic compound.

3. The proton conductor according to claim 1, wherein said proton acceptor is a basic organic compound.

4. The proton conductor according to claim 1, wherein said proton acceptor is a dissociation-facilitating polymer which facilitates dissociation of said proton.

5. The proton conductor according to claim 1, wherein at least one of said acidic group-containing polymer and said proton acceptor forms a covalent bond with respect to inner surfaces of said pores.

6. The proton conductor according to claim 1, wherein an ion exchange capacity of said acidic group-containing polymer is not less than 3 mmol/g.

7. The proton conductor according to claim 1, wherein a freezing point of said proton acceptor is less than 0° C.

8. The proton conductor according to claim 1, wherein a retention ratio of said acidic group-containing polymer and said proton acceptor in said pores, which is obtained after being immersed in water for 3 hours, is not less than 50%.

9. The proton conductor according to claim 1, wherein said acidic group-containing polymer and said proton acceptor occupy not less than 20% of a total volume of said pores.

10. The proton conductor according to claim 1, wherein 0.1 to 20 mol of said proton acceptor is provided with respect to 1 mol of said acidic group-containing polymer provided that a repeating unit, which contains one acidic group, is defined to represent 1 mol of said acidic group-containing polymer.

11. The proton conductor according to claim 1, wherein a porosity of said porous member is 20% to 95% by volume.

12. The proton conductor according to claim 1, wherein said acidic group is sulfonic acid group, sulfonylimide group, phosphoric acid group, phosphonic acid group, or carboxyl group.

13. The proton conductor according to claim 2, wherein said cation is imidazolium cation, pyridium cation, pyrrolidium cation, cation derived from alicyclic amine, or cation derived from aliphatic amine.

14. The proton conductor according to claim 3, wherein said basic organic compound is a nitrogen-containing organic compound.

15. The proton conductor according to claim 14, wherein said basic organic compound is imidazole, pyrazole, pyridine, amine, or any derivative thereof with side chain bonded thereto.

16. The proton conductor according to claim 15, wherein said side chain is alkyl group, ether group, carbonyl group, ester group, or hydroxyl group.

17. The proton conductor according to claim 4, wherein said dissociation-facilitating polymer is polyethylene glycol or polyethylene carbonate.

18. The proton conductor according to claim 4, wherein said dissociation-facilitating polymer is a polymer with any side chain bonded as functional group to facilitate said dissociation of said proton.

19. The proton conductor according to claim 18, wherein said functional group is hydroxyl group or amide group.

20. The proton conductor according to claim 18, wherein a principal chain of said dissociation-facilitating polymer has a structure such that a monomer having carbon-carbon double bond is polymerized.

21. The proton conductor according to claim 20, wherein said dissociation-facilitating polymer is polyvinyl alcohol or polyvinylacetamide.

* * * * *